(12) United States Patent
Gossage

(10) Patent No.: US 9,380,241 B2
(45) Date of Patent: Jun. 28, 2016

(54) MULTIPLE CHANNEL MATCHING METHOD

(71) Applicant: Thorlabs, Inc., Newton, NJ (US)

(72) Inventor: Kirk Gossage, Austin, TX (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 14/520,984

(22) Filed: Oct. 22, 2014

(65) Prior Publication Data

US 2015/0116567 A1    Apr. 30, 2015

Related U.S. Application Data

(60) Provisional application No. 61/898,099, filed on Oct. 31, 2013.

(51) Int. Cl.
| | | |
|---|---|---|
| *H04N 5/374* | (2011.01) | |
| *H04N 5/378* | (2011.01) | |
| *H04N 5/365* | (2011.01) | |
| *H04N 5/372* | (2011.01) | |
| *H04N 5/3745* | (2011.01) | |

(52) U.S. Cl.
CPC ......... *H04N 5/37455* (2013.01); *H04N 5/3653* (2013.01); *H04N 5/37213* (2013.01)

(58) Field of Classification Search
CPC ... H04N 5/37455; H04N 5/378; H04N 5/357; H04N 5/3653; H04N 5/37213
USPC ............... 348/250, 251, 241, 222.1; 341/155
See application file for complete search history.

(56) References Cited

U.S. PATENT DOCUMENTS

| | | | | |
|---|---|---|---|---|
| 6,288,797 B1* | 9/2001 | Ueno | ........... | H04N 5/37213 358/443 |
| 6,606,172 B1* | 8/2003 | Moro | ........... | H04N 5/37213 348/E5.081 |
| 7,324,236 B2* | 1/2008 | Ohashi | ........... | H04N 1/4076 358/1.18 |
| 7,679,768 B2 | 3/2010 | Unno | | |
| 8,452,122 B2 | 5/2013 | Hitomi et al. | | |

FOREIGN PATENT DOCUMENTS

RU             105760 U1    6/2011

OTHER PUBLICATIONS

International Search Report and Written Opinion mailed Feb. 27, 2015 in corresponding International Application No. PCT/US2014/061756.

* cited by examiner

*Primary Examiner* — Nhan T Tran
(74) *Attorney, Agent, or Firm* — Graham Curtin, P.A.

(57) ABSTRACT

A method for matching one or more channels to a reference channel in a multiple-channel detector having a digital output, the method including: receiving an analog-to-digital unit (ADU) input value from the multiple-channel detector for each channel; and replacing the ADU input value by an output value corresponding to each channel from a look up table (LUT); wherein the LUT is created by taking a relative intensity ratio of signals from each channel compared to the reference channel over a range of voltage values; calculating a signal value on the detector that generates a specific ADU value across the entire ADU range of the detector; interpolating the relative intensity ratios to obtain ratios corresponding to the calculated signal values for each channel; and dividing the each of the specific ADU value by the corresponding interpolated ratio to obtain the corresponding output value for each channel.

4 Claims, 2 Drawing Sheets

MULTIPLE CHANNEL MATCHING METHOD

CROSS REFERENCES TO RELATED APPLICATIONS

This application claims the benefit of U.S. Provisional Patent Application No. 61/898,099 filed on Oct. 31, 2013. The disclosure of U.S. Provisional Patent Application 61/898,099 is hereby incorporated by reference.

FIELD OF THE INVENTION

The present invention relates to the field of multiple-channel detectors, and more particularly to a method and apparatus for matching one or more channels to a reference channel in a multiple-channel detector having a digital output.

BACKGROUND

Channel matching or balancing in multiple-channel digital cameras is a fundamental requirement for many applications, particularly those designed for human-viewable output such as displays or hardcopy output. However, channel balance can require considerable computational and calibration resources. Therefore, there is a need for a channel balance method that does not require much computational and calibration resources.

SUMMARY

Channel balance can require considerable computational and calibration resources. An embodiment of the present invention requires neither, instead, only requires combining a ratiometric characterization relative to a reference channel followed by a digital lookup table responsive to the user gain setting of the camera. In one embodiment, the method is implemented in a CCD camera and results in very good matching across the dynamic range of the device and across the range of user gain settings.

One embodiment of the invention provides a method for matching one or more channels to a reference channel in a multiple-channel detector having a digital output, the method including: receiving an analog-to-digital unit (ADU) input value from the multiple-channel detector for each channel; and replacing the ADU input value by an output value corresponding to each channel from a look up table (LUT); wherein the LUT is created by taking a relative intensity ratio of signals from each channel compared to the reference channel over a range of voltage values; calculating a signal value on the detector that generates a specific ADU value across the entire ADU range of the detector; interpolating the relative intensity ratios to obtain ratios corresponding to the calculated signal values for each channel; and dividing the each of the specific ADU value by the corresponding interpolated ratio to obtain the corresponding output value for each channel.

Another embodiment of the invention provides an imaging system including: a multi-channel detector having a digital output, one or more channels, and a reference channel; a memory device; and an image processor configured to: receive an analog-to-digital unit (ADU) input value from each channel; and replace the ADU input value by an output value corresponding to each channel from a look up table (LUT) stored in the memory device; wherein the LUT is created by taking a relative intensity ratio of signals from each channel compared to the reference channel over a range of voltage values; calculating a signal value on the detector that generates a specific ADU value across the entire ADU range of the detector; interpolating the relative intensity ratios to obtain ratios corresponding to the calculated signal values for each channel; and dividing the each of the specific ADU value by the corresponding interpolated ratio to obtain the corresponding output value for each channel.

DETAILED DESCRIPTION OF THE PREFERRED EMBODIMENTS

Figure 1:
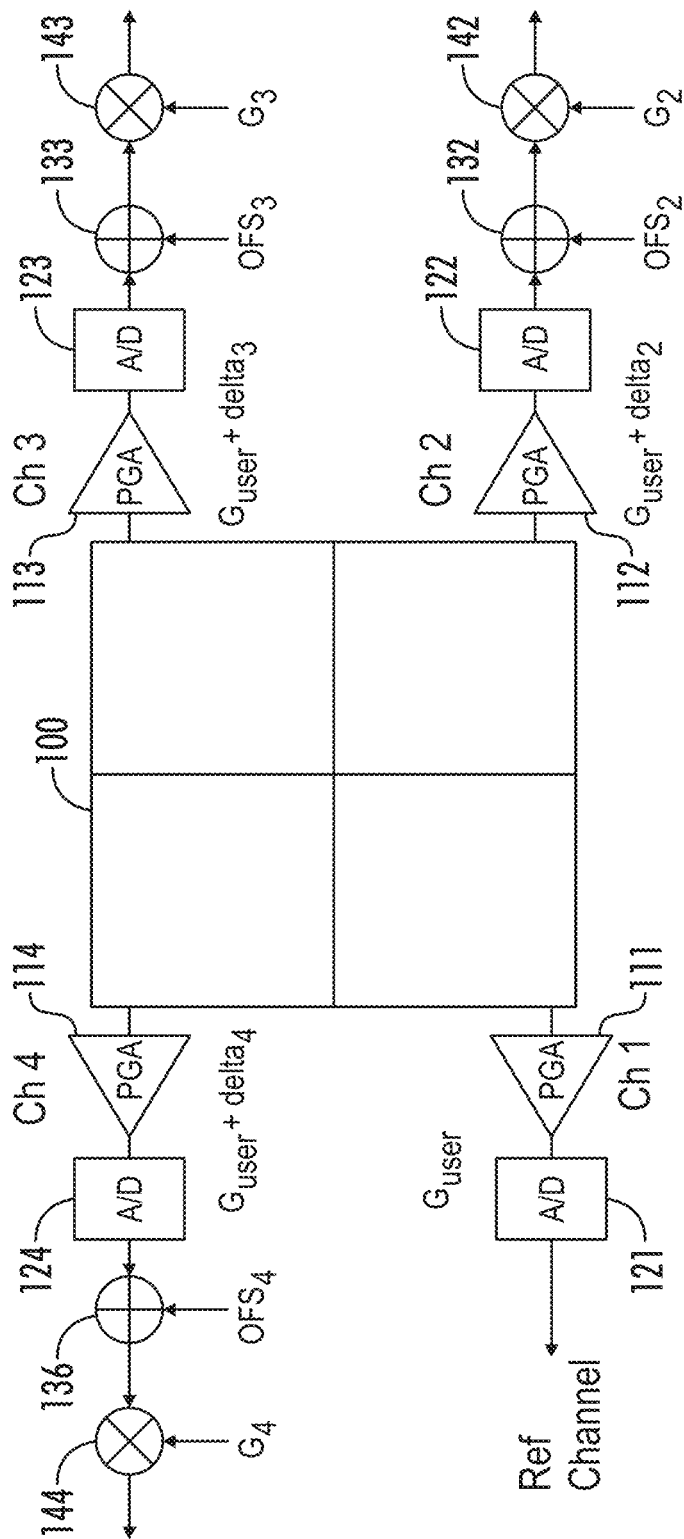
FIG. 1 is a simplified 4-tap CCD and digitization system.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

In imaging systems utilizing butted or integrated multi-channel focal plane arrays, each channel possesses a unique transfer function due to the individual parametric differences in each signal path. Therefore it is necessary to "balance" the channels to produce a smooth-looking, or "seamless" image.

The traditional approach to correct these per-tap differences is to model each channel by a first order linear equation, y=mx+b, where x is the input signal, y is the output signal.

FIG. 1 shows a simplified 4-tap CCD 100 and digitization system. In this system, each channel is assumed to be perfectly linear but with small differences in overall gain and offset (DC bias) relative to the others. Each channel utilizes a programmable gain amplifier (PGA) 111, 112, 113, 114 and A/D converter 121, 122, 123, 124, typically integrated into a single device called an analog front end or AFE. Channels 2-4 have downstream digital gain and offset correction denoted by the adder 132, 133, 134 and multiplier 142, 143, 144 with coefficients $G_i$ and $OFS_i$ (i=2, 3, 4).

Channel 1 is considered the reference channel. For simplification, it is assumed that channel 1 will be uncorrected and all the others channels are corrected to match channel 1 as accurately as is practical.

The analog PGA user gain setting is equal to $G_{user}$. When the user adjusts the gain slider, all channels will be adjusted equally, however the other channels will require an adjustment to that gain setting, $delta_i$, where i is the channel index (i=2, 3, 4). If a fine adjustment is required, additional digital correction can be implemented using the digital add and multiply stages, with correction factors $G_i$ and $OFS_i$ (i=2, 3, 4).

The impact of the analog programmable gain amplifier (PGA) needs to be considered. The programmable, analog gain stage combined with channel nonlinearity introduces the practical consideration of gain-dependent error (the signal-dependence due to nonlinear effects will be covered later). Therefore the system will need a series of corrections that work for a limited range of gain settings around a set of $G_{user}$ values. As user gain is adjusted across the usable gain range during operation, different sets of correction values are chosen based on predetermined thresholds. This scheme compensates for deviations from ideal as each PGA amplifier is adjusted, and it partially compensates for upstream nonlinearity because different corrections are available for different ranges of the upstream transfer function.

For example, we might use different corrections at $G_{user}=1$ and vicinity, 5, 10, 15, 20, 25, 30, and 35. In the general case, the stored values would become:

$Guser_1$: $delta_{21}$, $delta_{31}$, $delta_{41}$, $G_{21}$, $G_{31}$, $G_{41}$, $OFS_{21}$, $OFS_{31}$, $OFS_{41}$ $Guser_2$: $delta_{22}$, $delta_{32}$, $delta_{42}$, $G_{22}$, $G_{32}$, $G_{42}$, $OFS_{22}$, $OFS_{32}$, $OFS_{42}$

. . .

$Guser_j$: $delta_{2j}$, $delta_{3j}$, $delta_{4j}$, $G_{2j}$, $G_{3j}$, $G_{4j}$, $OFS_{2j}$, $OFS_{3j}$, $OFS_{4j}$ Where j is the number of intervals within the gain range for which a unique set of correction coefficients are required and where j is determined empirically by characterizing a representative set of systems.

The set of coefficients will be unique to each unit and will be computed at a calibration fixture.

A simple multiply can be done in the camera or on the host, although where the operation is performed is not important in the context of this document.

In practice, nonlinearity in each channel results in these corrections only being adequate over a subset of the range of x values, and an improvement was necessary.

The following describes one non-limiting example embodiment of the present invention to improve the channel matching over a wider range of camera operating conditions. For ease of illustration, a 4-channel CCD camera example is used. In this example, the 4 channels correspond to the 4 quadrants of the sensor respectively. In general, the method is applicable to a multi-channel detector having any number of channels.

Figure 2:
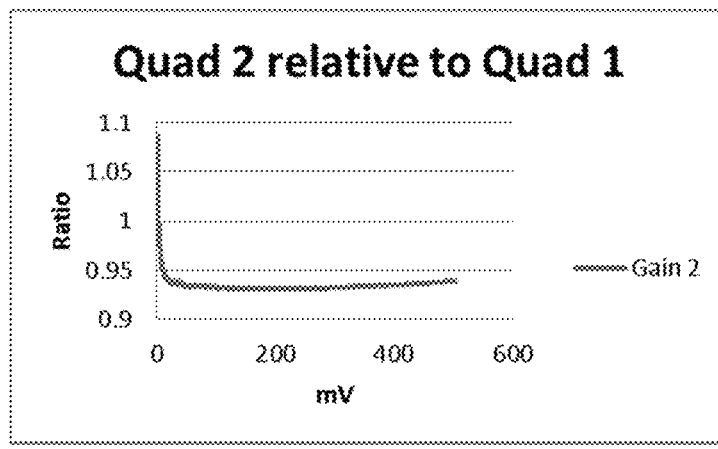
FIG. 2 shows how the relative intensities of signals obtained in quadrant 2 compared to quadrant 1 from a 4-channel CCD camera.
Figure 3:
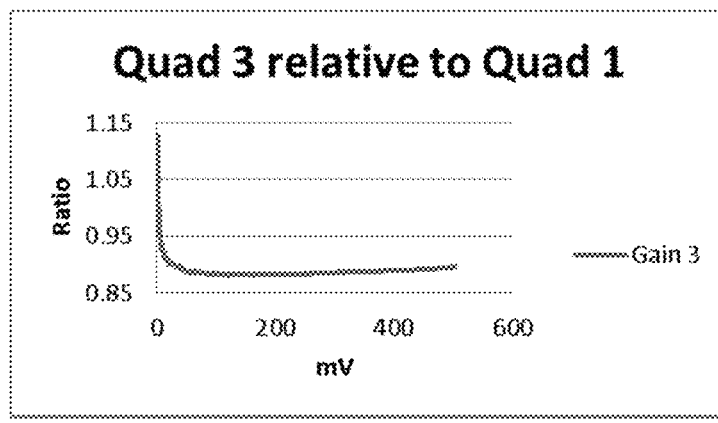
FIG. 3 shows how the relative intensities of signals obtained in quadrant 3 compared to quadrant 1 from a 4-channel CCD camera.
Figure 4:
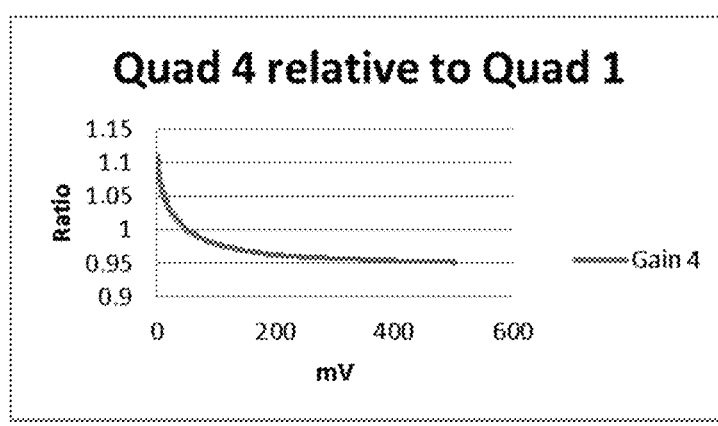
FIG. 4 shows how the relative intensities of signals obtained in quadrant 4 compared to quadrant 1 from a 4-channel CCD camera.

FIGS. 2-4 show how the relative intensities of signals obtained in quadrants 2-4 compared to quadrant 1 from an actual 4-channel CCD camera. Note that different cameras/detectors would have different relative intensities. The values shown in FIGS. 2-4 are for illustration purposes. In this case, the offset corrections, OFS, are all zero and therefore eliminated.

In FIGS. 2-4, the y-axis is intensity ratio of the given quadrant relative to quadrant 1, and the x-axis is the signal level, x, in millivolts of channel 1. FIGS. 2-4 show the relative intensity of the quadrants across the entire dynamic range of the CCD. Note that the actual range of the ratio data used at any one time is based on the desired gain, $G_{user}$ of the 4 channels.

In an embodiment of the present invention, a lookup table, also known as a LUT, is created for each quadrant, with values derived from the signal vs. channel ratios, or "master tables" shown in FIGS. 2-4. The LUT is created from the master tables based on the gain setting, $G_{user}$, and is converted back to digital values for the lookup table. As $G_{user}$ is increased, the extent of the master table used decreases.

For example, at $G_{user}=1$, the entire master table (x values from 0 to 500 mV) is used for each channel. At $G_{user}=2$, only half of the master table is used (x values from 0 to 250 mV) of the camera. Since the LUT has fewer entries at higher $G_{user}$ values, interpolation is necessary to populate the intermediate values.

To create the $G_{user}$-dependent lookup table, start with the master table which contains the relative gains to one of the quadrants (in this case quadrant 1 is the reference, but in general, any quadrant can be used as the reference) in terms of millivolts (mV). An example is shown in Table 1:

TABLE 1

| mV | Gain 1 | Gain 2 | Gain 3 | Gain 4 |
|---|---|---|---|---|
| 0 | 1 | 1.07407 | 1.125893 | 1.086194 |
| 1.32811 | 1 | 1.080279 | 1.127423 | 1.09741 |
| 1.349378 | 1 | 1.086488 | 1.128953 | 1.108627 |
| 1.392361 | 1 | 1.082387 | 1.129363 | 1.088252 |
| 1.480501 | 1 | 1.063681 | 1.090904 | 1.08377 |
| 1.879822 | 1 | 1.04498 | 1.078453 | 1.093611 |
| . . . | . . . | . . . | . . . | . . . |
| 501.7231 | 1 | 0.939206 | 0.895597 | 0.952055 |
| 502.605 | 1 | 0.939324 | 0.895674 | 0.951926 |
| 503.2774 | 1 | 0.939368 | 0.895662 | 0.951835 |

The next step is to, using Equation 1, calculate the mV signal on the CCD that would generate the specific digital values (ADU) across the entire ADU range of the camera (for example, 0-4095 for a 12-bit camera, 0-16383 for a 14-bit camera, etc.):

$$mV = V_{ADU} \times \frac{D}{D_{Range}} \Big/ Gain \qquad \text{(Equation 1)}$$

Where $V_{ADU}$ is the full voltage range of the final ADC of the camera, $D_{Range}$ is the max ADU (4096, 16383, etc.), D is a specific ADU value (0-4095, 0-16383, etc.), and Gain is how much the CCD signal in milliVolts is amplified before the signal gets to the ADC. The various quadrant gains are then linearly interpolated from the master table based on the mV. An example of the results of this calculation is shown in Table 2.

TABLE 2

| mV | ADU | Quad1 | Quad2 | Quad3 | Quad4 |
|---|---|---|---|---|---|
| 0 | 0 | 1 | 1.07407 | 1.125893 | 1.086194 |
| 0.018821 | 1 | 1 | 1.074158 | 1.125915 | 1.086353 |
| 0.037641 | 2 | 1 | 1.074246 | 1.125936 | 1.086512 |
| 0.056462 | 3 | 1 | 1.074334 | 1.125958 | 1.086671 |
| 0.075283 | 4 | 1 | 1.074422 | 1.12598 | 1.08683 |
| 0.094104 | 5 | 1 | 1.07451 | 1.126001 | 1.086989 |
| ... | ... | ... | ... | ... | ... |
| 308.3024 | 16381 | 1 | 0.932147 | 0.886057 | 0.957236 |
| 308.3213 | 16382 | 1 | 0.932149 | 0.886059 | 0.957235 |
| 308.3401 | 16383 | 1 | 0.932151 | 0.886061 | 0.957233 |

The look up table (LUT) is then created for each quadrant by taking the input digital value (ADU) and dividing by the corresponding quadrant ratio for each ADU value. An example of the LUT is shown in Table 3.

TABLE 3

| LUT In | Q1 LUT Out | Q2 LUT Out | Q3 LUT Out | Q4 LUT Out |
|---|---|---|---|---|
| 0 | 0 | 0 | 0 | 0 |
| 1 | 1 | 1 | 1 | 1 |
| 2 | 2 | 2 | 2 | 2 |
| 3 | 3 | 3 | 3 | 3 |
| 4 | 4 | 4 | 4 | 4 |
| 5 | 5 | 5 | 4 | 5 |
| ... | ... | ... | ... | ... |
| 927 | 927 | 985 | 1021 | 894 |
| 928 | 928 | 986 | 1022 | 895 |
| 929 | 929 | 988 | 1023 | 896 |
| ... | ... | ... | ... | ... |
| 16381 | 16381 | 16383 | 16383 | 16383 |
| 16382 | 16382 | 16383 | 16383 | 16383 |
| 16383 | 16383 | 16383 | 16383 | 16383 |

This LUT, which can be stored in a non-transitory computer readable medium, is then used by an image processor to correct the image by taking the input ADU from the camera (LUT In) and replacing the input value with the output value (LUT Out) for each pixel depending on what quadrant the pixel came from (Q1, Q2, Q3, or Q4).

Note that the values shown in Tables 1-3 are for illustration purposes. Different cameras/detectors will have different values.

In another embodiment, the similar LUT technique described above can be used alone or in conjunction with the quad-tap correction to correct the camera for a nonlinear photon response. This would additionally require a calibrated light source to measure the CCD response to a known photon count ranging from no light hitting the CCD to CCD saturation. A LUT could then be generated mapping the CCD's response to the known light to the desired linear response. This could be done for entire CCD at once in single tap mode, or a single tap (of the quadrant to match in multi-tap mode).

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for matching one or more channels to a reference channel in a multiple-channel detector having a digital output, the method comprising:
   receiving an analog-to-digital unit (ADU) input value from the multiple-channel detector for each channel; and
   replacing the ADU input value by an output value corresponding to each channel from a look up table (LUT);
   wherein the LUT is created by:
   taking a relative intensity ratio of signals from each channel compared to the reference channel over a range of voltage values;
   calculating a signal value on the detector that generates a specific ADU value across the entire ADU range of the detector;
   interpolating the relative intensity ratios to obtain ratios corresponding to the calculated signal values for each channel; and
   dividing the each of the specific ADU value by the corresponding interpolated ratio to obtain the corresponding output value for each channel; and
   wherein the signal value is calculated by the formula:

$$mV = V_{ADU} \times \frac{D}{D_{Range}} \Big/ Gain,$$

where mV is the signal on the detector, $V_{ADU}$ is the full signal range of an analog-to-digital conversion of the detector, $D_{Range}$ is the maximum ADU of the detector, and Gain is an amplification of a detected signal before the analog-to-digital conversion.

2. The method of claim 1, wherein the multiple-channel detector is a charge coupled device (CCD) camera.

3. An imaging system comprising:
   a multi-channel detector having a digital output, one or more channels, and a reference channel;
   a memory device; and
   an image processor configured to:
   receive an analog-to-digital unit (ADU) input value from each channel; and
   replace the ADU input value by an output value corresponding to each channel from a look up table (LUT) stored in the memory device;
   wherein the LUT is created by:
   taking a relative intensity ratio of signals from each channel compared to the reference channel over a range of voltage values;
   calculating a signal value on the detector that generates a specific ADU value across the entire ADU range of the detector;
   interpolating the relative intensity ratios to obtain ratios corresponding to the calculated signal values for each channel; and
   dividing the each of the specific ADU value by the corresponding interpolated ratio to obtain the corresponding output value for each channel; and
   wherein the signal value is calculated by the formula:

$$mV = V_{ADU} \times \frac{D}{D_{Range}} \Big/ Gain,$$

where mV is the signal on the detector, $V_{ADU}$ is the full signal range of an analog-to-digital conversion of the detector, $D_{Range}$ is the maximum ADU of the detector, and Gain is an amplification of a detected signal before the analog-to-digital conversion.

4. The system of claim 3, wherein the detector is a multiple-channel charge coupled device (CCD) camera.

* * * * *